United States Patent Office 2,704,768
Patented Mar. 22, 1955

2,704,768

17-(β-HYDROXYETHYLIDENE) - 13 - METHYL-1,2,3,6,7,8,9,10,11,12,13,14,16,17 - TETRADECA-HYDRO - 15H - CYCLOPENTA [a] PHENAN-THREN-3-ONE AND ESTERS THEREOF

Frank B. Colton, Chicago, Ill., assignor to G. D. Searle & Co., Chicago, Ill., a corporation of Illinois No Drawing. Application May 25, 1953, Serial No. 357,377

5 Claims. (Cl. 260—397.47)

The present invention relates to a new group of organic polycyclic compounds and, more particularly to 17-(β-hydroxyethylidene) - 13 - methyl - 1,2,3,6,7,8,9,10,11,12,-13,14,16,17 - tetradecahydro - 15H - cyclopenta[a]-phenanthren-3-one and its esters. These compounds can be represented by the structural formula

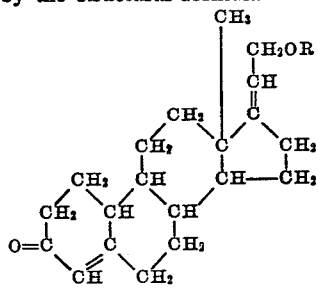

wherein R is a member of the class consisting of hydrogen, benzoyl and (lower alkyl)-CO— radicals. Among the radicals which R can represent are acetyl, propionyl, butyryl, pentanoyl, hexanoyl, benzoyl, phenacetyl and the like.

The claimed compositions are active horomonal agents. They are capable of maintaining life in adrenalectomized mammals. A special field of utility of these compounds consists in their use as starting material in the synthesis of adrenocortical hormones and especially of 2,17-dihydroxy - 17 - (β - hydroxyacetyl) - 13 - methyl - 1,2,3,6,7,-8,9,10,11,12,13,14,16,17 - tetradecahydro - 15H - cyclopenta[a]phenanthren-3-one, a compound which combines valuable activities of the glucocorticoid adrenal hormones with an extremely potent life maintaining and growth promoting activity in adrenalectomized mammals. The compounds of this invention can be prepared by the method described in my copending application, Serial Number 286,611, filed May 7, 1952, issued as U. S. Patent 2,655,-518, on October 13, 1953, of which the present application is a continuation-in-part. An alternative procedure is indicated in the experimental part below. The final step in the preparation of the claimed compounds can be represented by the following structural formulae.

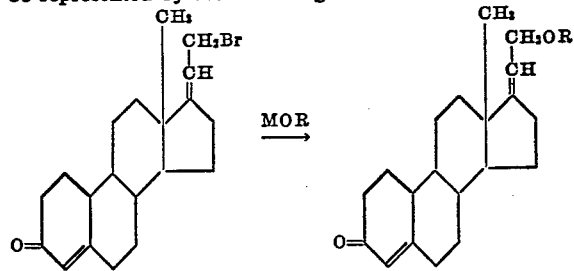

R is defined as hereinabove and M as an alkali metal such as sodium or potassium.

This experimental part illustrates the procedure used in the practice of my invention and the compounds prepared thereby. However, the invention is not to be construed as limited by the details set forth in spirit or in scope. It will be apparent to those skilled in the art that many modifications in materials and methods may be practiced without departing from the invention. In each of these examples temperatures are given in degrees centigrade (° C.) and relative amounts of materials in parts by weight.

Example 1

A stirred solution of 10.6 parts of 3-methoxy-13-methyl - 1,4,6,7,8,9,11,12,13,14,16,17 - dodecahydro - 15H-cyclopenta[a]phenanthren-17-one in 700 parts of anhydrous ether and 45 parts of dry toluene is cooled to 0° C. and saturated with dry acetylene. While a slow stream of acetylene is passed through the reaction mixture, a solution of 20 parts of potassium t-amylate in 135 parts of anhydrous pentanol is added in the course of 15 minutes with stirring. Passage of acetylene and stirring are continued for an additional 4½ hours. After standing at 0° C. for 16 hours, the mixture is washed with aqueous ammonium chloride solution until the aqueous phase is neutral, then with water and saturated sodium chloride solution. The organic layer is dried over anhydrous sodium sulfate, filtered and concentrated under vacuum to a residue of about 250 parts. 500 parts of petroleum ether are added and, after standing at 0° C. for an hour, the mixture is filtered. The collected precipitate is recrystallized from ether. The resulting 3-methoxy-13-methyl - 17 - ethynyl - 1,4,6,7,8,9,11,12,13,14,16,17 - dodecahydro - 15H - cyclopenta[a]phenanthren - 17 - ol melts at about 181–182° C. The rotation as determined in a 1% chloroform solution is [α]D=+65°. An additional amount of this product can be obtained from the mother liquors by concentration under vacuum followed by addition of petroleum ether.

Example 2

To a refluxing solution of 47.5 parts of 3-methoxy-13-methyl - 17 - ethynyl - 1,4,6,7,8,9,11,12,13,14,16,17 - dodecahydro - 15H - cyclopenta[a]phenanthren-17-ol in 3200 parts of methanol and 1000 parts of water are added 240 parts of concentrated hydrochloric acid. Refluxing is continued for an additional 5 minutes after which the solution is maintained at room temperature for 15 minutes. Then 13,000 parts of water are added and the mixture is cooled to 0° C. After standing for several hours at that temperature, the mixture is filtered and the precipitate is dried and crystallized from ethyl acetate. The 13 - methyl - 17 - ethynyl - 17 - hydroxy - 1,2,3,6,7,-8,9,10,11,12,13,14,16,17 - tetradecahydro - 15H - cyclopenta[a]phenanthren-3-one thus obtained melts at about 202–204° C. The rotation, as determined in a 1% chloroform solution, is [α]D=—22.5°. The ultraviolet absorption spectrum of a methanolic solution shows a maximum at 241 millimicrons with a molecular extinction coefficient of 17,100. The compound has the structural formula

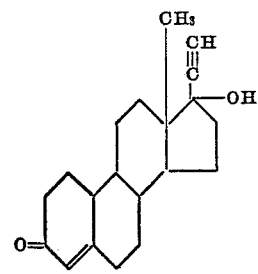

Example 3

A solution of 53.7 parts of 13-methyl-17-ethynyl-17-hydroxy - 1,2,3,6,7,8,9,10,11,12,13,14,16,17 - tetradecahydro - 15H - cyclopenta[a]phenanthren - 3 - one in 1500 parts of dioxane and 1000 parts of pyridine is reduced in an atmosphere of hydrogen over 30 parts of a catalyst containing 5% palladium on calcium carbonate. On absorption of one molecule of hydrogen the reduction is stopped and the mixture is filtered. The filtrate is concentrated under vacuum to about 500 parts, diluted with 3000 parts of ether and washed with normal hydrochloric acid until a Congo red test shows an acidic reaction. The solution is washed successively with water, 5% sodium bicarbonate, water and saturated sodium chloride solution. The ether extract is dried over sodium sulfate, concentrated on the steam bath to about 500 parts and diluted with 800 parts of petroleum ether. After storage at 0° C. for 16 hours, the product is collected on a filter, dried and crystallized from a mixture of ethyl acetate and petroleum ether. The 13-methyl-17-vinyl-17-hydroxy-1,2,-3,6,7,8,9,10,11,12,13,14,16,17 - tetradecahydro - 15H - cyclopenta[a]phenanthren-3-one thus obtained melts at about 169–171° C. The rotation of an alcoholic solution is $[\alpha]_D = +36°$. This compound has the structural formula

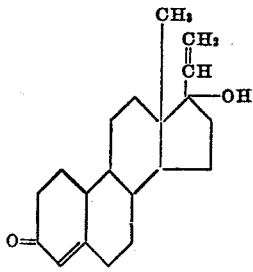

Example 4

A solution of 47.3 parts of phosphorus tribromide in 645 parts of anhydrous ethanol-free chloroform is added dropwise to a solution of 142.9 parts of 13-methyl-17-vinyl - 17 - hydroxy - 1,2,3,6,7,8,9,10,11,12,13,14,16,17-tetradecahydro - 15H-cyclopenta[a]phenanthren - 3 - one in 2250 parts of chloroform and 10 parts of pyridine, maintained at —20° C. After standing at room temperature for 16 hours, the mixture is treated with chloroform and then successively with dilute hydrochloric acid, dilute sodium bicarbonate solution and finally with water. After drying over anhydrous sodium sulfate, the chloroform is stripped off, leaving as a residue the 17-(β-bromoethylidene) - 13 - methyl - 1,2,3,6,7,8,9,10,11,12,13,-14,16,17 - tetradecahydro - 15H - cyclopenta[a]phenanthren-3-one. This compound has the structural formula

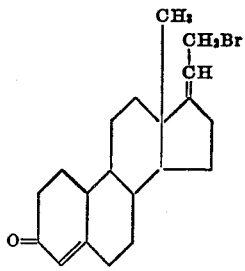

Example 5

45 parts of 17-(β-bromoethylidene)-13-methyl-1,2,3,-6,7,8,9,10,11,12,13,14,16,17 - tetradecahydro - 15H - cyclopenta[a]phenanthren-3-one are treated with 400 parts of freshly fused potassium acetate and refluxed for 5 hours in 3200 parts of dry acetone. After cooling the precipitate is removed by filtration and the acetone is distilled in vacuum under nitrogen. The residue is extracted by refluxing with boiling petroleum ether and, after stripping of the solvent in vacuo, the residue is chromatographed over 4500 parts of silica gel. Elution with a 3% solution of ethyl acetate in benzene, evaporation of the solvent from the eluate and crystallization of the residue from aqueous acetone and petroleum ether yields 13 - methyl - 17 - vinyl - 1,2,3,6,7,8,9,10,11,12,13,-14 - dodecahydro - 15H - cyclopenta[a]phenanthren - 3-one, melting at about 100–101° C. The rotation of an 0.66% chloroform solution is $[\alpha]_D = +110.5°$. The ultraviolet absorption spectrum of a methanolic solution shows a maximum at 237 millimicrons with a molecular extinction coefficient of 30,200. This compound has the structural formula

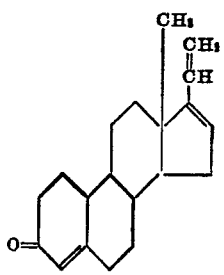

Elution of the chromatography column with a 10% solution of ethyl acetate in benzene, evaporation of the solvent from the eluate and recrystallization of the residue from aqueous acetone yields the 17-(β-acetoxyethylidene) - 13 - methyl - 1,2,3,6,7,8,9,10,11,12,13,14,16,17-tetradecahydro - 15H - cyclopenta[a]phenanthren - 3-one. This compound is obtained in two polymorphic crystalline forms, one melting at 49–50° C., the other melting at about 96–97° C. The rotation of a 1% chloroform solution is $[\alpha]_D = +62.5°$. The ultraviolet absorption spectrum of a methanolic solution shows a maximum at 241 millimicrons with a molecular extinction coefficient of 17,800. This compound has the structural formula

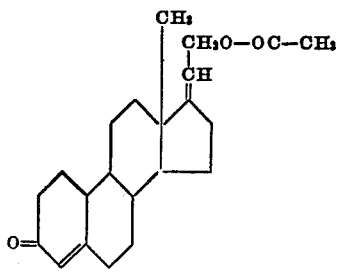

Example 6

1000 parts of a 2-N potassium hydroxide solution in 75% aqueous methanol are treated with 45.9 parts of 17 - (β - acetoxyethylidene) - 13 - methyl - 1,2,3,6,7,-8,9,10,11,12,13,14,16,17 - tetradecahydro - 15H - cyclopenta[a]phenanthren-3-one and refluxed for 17 minutes. Water is added to turbidity and the mixture is cooled to 0° C. The precipitate is collected on a filter, washed with water and dissolved in ethyl acetate. The solution is decolorized with charcoal, concentrated to one-third of its volume and treated with petroleum ether to induce crystallization. The 17-(β-hydroxyethylidene)-13-methyl - 1,2,3,6,7,8,9,10,11,12,13,14,16,17 - tetradecahydro-15H-cyclopenta[a]phenanthren-3-one thus obtained melts at about 151–153° C. The identical product is obtained by alkaline hydrolysis in methanol of the 17-(β-bromoethylidene) - 13 - methyl - 1,2,3,6,7,8,9,10,11,12,13,14,-16,17 - tetradecahydro - 15H - cyclopenta[a]phenanthren-3-one obtained in Example 4. A mixed melting point test of the material obtained by these two methods shows no depression. A 1% chloroform solution shows an optical rotation $[\alpha]_D = +51°$. The product has the structural formula

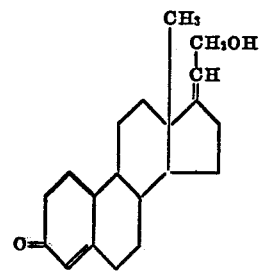

Example 7

A mixture of 30 parts of 17-(β-bromoethylidene)-13-methyl - 1,2,3,6,7,8,9,10,11,12,13,14,16,17 - tetradecahydro-15H-cyclopenta[a]phenanthren-3-one and 40 parts of potassium benzoate is refluxed for 8 hours in 4000 parts of anhydrous acetone, cooled and filtered. The filtrate is freed from solvent by vacuum distillation under nitrogen. Chromatographic separation as in Example 5 on a silica gel column yields first the 13-methyl-17-vinyl - 1,2,3,6,7,8,9,10,11,12,13,14 - dodecahydro - 15H-cyclopenta[a]phenanthren-3-one and then the 17-(β-benzoyloxy) - 13 - methyl - 1,2,3,6,7,8,9,10,11,12,13,-14,16,17 - tetradecahydro - 15H - cyclopenta[a]phenanthren-3-one. The ultraviolet absorption spectrum of the latter shows a maximum at 235 millimicrons with a molecular extinction coefficient of 27,700. The infrared absorption spectrum shows maxima at 5.8, 6.0, 7.9 and 9.1 microns. This compound has the structural formula

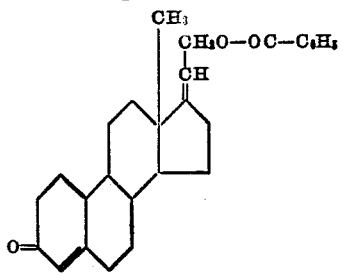

Example 8

To a solution of 25 parts of 17-(β-acetoxyethylidene)-13 - methyl - 1,2,3,6,7,8,9,10,11,12,13,14,16,17 - tetradecahydro - 15H - cyclopenta[a]phenanthren - 3 - one in 200 parts of tertiary butanol are added 0.27 part of osmium tetroxide in 16 parts of tertiary butanol, followed immediately by 60 parts of a 3.27-N hydrogen peroxide solution in tertiary butanol. In the course of the following two hours, a solution of 1.25 parts of osmium tetroxide in 80 parts of tertiary butanol is added. After standing at room temperature for 24 hours, the mixture is treated with 1500 parts of water and concentrated in vacuum at room temperature until about 320 parts of distillate have been collected. The residue is extracted with ethyl acetate and the extract is washed with water, dried over sodium sulfate, filtered, and evaporated to dryness. The residue is taken up in 1000 parts of methanol and refluxed for 30 minutes with a solution of 9 parts of sodium sulfite in 200 parts of water. The reaction mixture is concentrated to about one-half of its original volume under nitrogen and extracted with ethyl acetate. This extract is washed with water, dried over sodium sulfate and evaporated. The residue contains a mixture of 13 - methyl - 17 - glycolyl - 17 - hydroxy-1,2,3,6,7,8,9,10,11,12,13,14,16,17 - tetradecahydro - 15H-cyclopenta[a]phenanthren - 3 - one and 17 - (α,β - dihydroxyethyl) - 17 - hydroxy - 13 - methyl - 1,2,3,6,7,8,-9,10,11,12,13,14,16,17 - tetradecahydro - 15H - cyclopenta[a]phenanthren-3-one. These compounds have the structural formulae

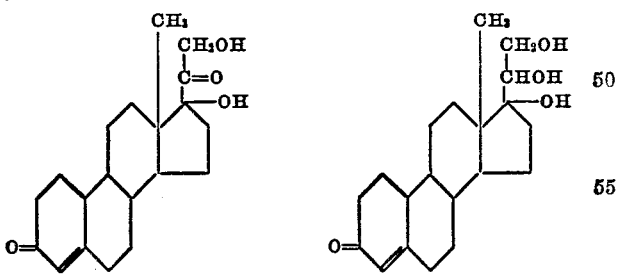

In addition the mixture contains a third compound which is apparently 4,5-dihydroxy-13-methyl-17-(β-hydroxyethylidene)perhydro - 15H - cyclopenta[a]phenanthren-3-one of the structural formula

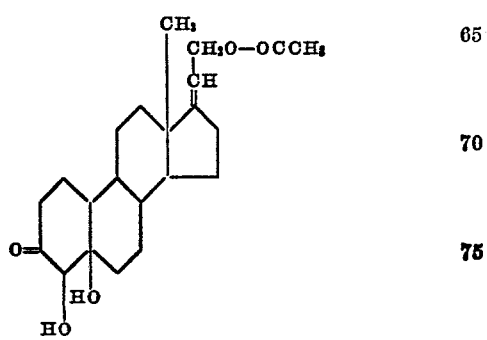

The above residue is dissolved in 35 parts of pyridine and 35 parts of acetic anhydride and kept at room temperature for 15 hours. Ice and, 2 hours later, water is added and the mixture is extracted with ethyl acetate. This extract is washed with dilute hydrochloric acid, sodium bicarbonate and water. After drying over sodium sulfate, the extract is evaporated under vacuum and the residue is chromatographed over 250 parts of silica gel. The column is eluted first with 1500 parts of a 10% solution of ethyl acetate in benzene. Elution with 500 parts each of a 10% and a 15% solution of ethyl acetate in benzene yields unreacted starting material. The column is next washed with an additional 500 parts of a 15% solution of ethyl acetate in benzene. Elution with a further 500-part portion of such a 15% solution and evaporation of the solvent yields a residue which, when crystallized from a mixture of ethyl acetate and petroleum ether and then from ether, forms crystals melting at about 185–187° C. This material gives a positive blue tetrazolium test and does not have a specific absorption maximum in the ultraviolet spectrum between 220 and 330 millimicrons. The infrared spectrum shows maxima at about 2.78, 5.78, 6.9, 7.3, 8.06, 8.79, 9.21, 9.5, 9.75, 10.3, 10.55, 10.8 and 11.3 microns. The compound is apparently 4 - acetoxy - 5 - hydroxy - 13 - methyl - 17-(β - acetoxyethylidene)perhydro - 15H - cyclopenta[a]phenanthren-3-one of the structural formula

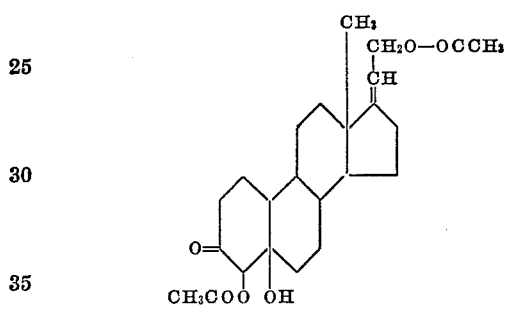

Elution of the column with 2000 parts of a 20% ethyl acetate in benzene solution, concentration of the eluate under vacuum and repeated recrystallizations from aqueous methanol and then from a mixture of ethyl acetate and petroleum ether yields the 13-methyl-17-(β-acetoxyacetyl) - 17 - hydroxy - 1,2,3,6,7,8,9,10,11,12,13,14,16,17-tetradecahydro - 15H - cyclopenta[a]phenanthren - 3 - one melting at about 233–235° C. A 1% chloroform solution shows a rotation of $[\alpha]_D = +88°$. The ultraviolet absorption spectrum shows a maximum at 242 millimicrons with a molecular extinction coefficient of 17,700. This compound has the structural formula

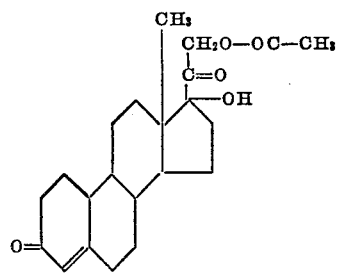

Further elution of the chromatography column with 2000 parts of a 20% solution and 1000 parts of a 30% solution of ethyl acetate in benzene and concentration of the eluate yields the 17-(α,β-diacetoxyethyl)-17-hydroxy-13 - methyl - 1,2,3,6,7,8,9,10,11,12,13,14,16,17 - tetradecahydro - 15H - cyclopenta[a]phenanthren - 3 - one which, recrystallized from ethyl acetate and petroleum ether, melts at about 194–196° C. The rotation of an 0.28% chloroform solution is $[\alpha]_D = +13.5°$. This compound has the structural formula

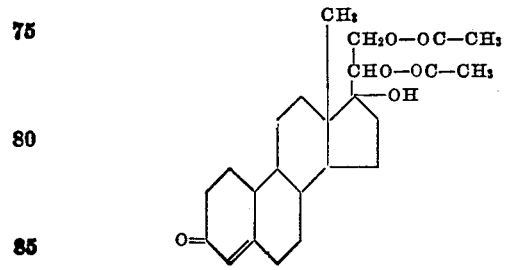

Example 9

1 part of 13-methyl-17-(β-acetoxyacetyl)-17-hydroxy-1,2,3,6,7,8,9,10,11,12,13,14,16,17-tetradecahydro - 15H-cyclopenta[a]phenanthren-3-one is stirred with 5000 parts of citrated beef blood and 5000 parts of 0.85% aqueous sodium chloride solution. This solution is perfused three times through a surviving beef adrenal, cannulated through the vein and having a finely lacerated surface. The perfusate is then extracted with isopropyl acetate. This extract is dried by azeotropic distillation and then concentrated to a residue of about 50 parts and diluted with 250 parts of benzene. On standing some dihydroxy - 17 - (β - hydroxyacetyl)-13-methyl-1,2,3,6,7,8,9,10,11,12,13,14,16,17-tetradecahydro - 15H-cyclopenta[a]phenanthren-3-one is obtained. Upon crystallization from a mixture of ethyl acetate and petroleum ether, using charcoal decolorization, it melts at 231–233° C. with decomposition. Additional yield is obtained by application of the mother liquors to a chromatography column containing 15 parts of silica gel. The column is washed with 50 parts of a 10% solution of ethyl acetate in benzene, 100 parts of a 20% solution and 250 parts of a 50% solution of ethyl acetate in benzene. Subsequent elution with 450 parts of ethyl acetate, concentration of the eluate and recrystallization of the residue from a mixture of ethyl acetate and petroleum ether yields the principal quantity of the dihydroxy-17-(β-hydroxyacetyl)-13 - methyl-1,2,3,6,7,8,9,10,11,12,13,14,-16,17-tetradecahydro - 15H-cyclopenta-[a]phenanthren-3-one, melting at 231–234° C. An 0.25% ethanol solution shows a rotation $[\alpha]_D = +130°$. The ultraviolet absorption hpectrum of a methanolic solution shows a maximum at 242 millimicrons with a molecular extinction coefficient of 17,400. It gives a blue tetrazolium test and a red color with concentrated sulfuric acid.

I claim:

1. A compound of the structural formula

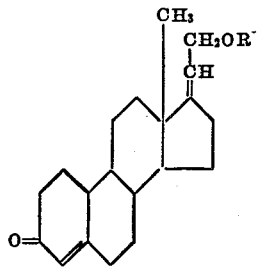

wherein R is a member of the class consisting of hydrogen, benzoyl and (lower alkyl)-CO- radicals.

2.

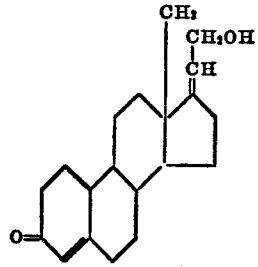

3. A compound of the structural formula

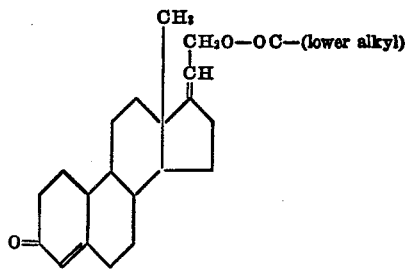

4.

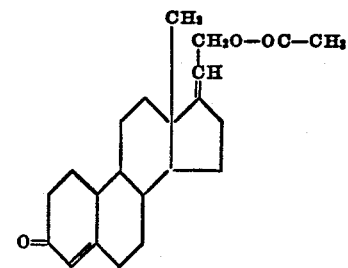

5.

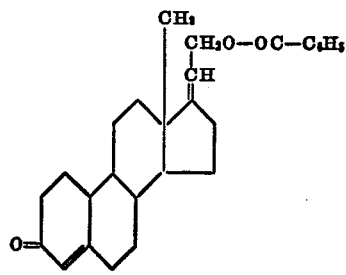

References Cited in the file of this patent

UNITED STATES PATENTS 2,528,897   Mayfield _____ Nov. 7, 1950